United States Patent [19]

Greve

[11] 4,256,635
[45] Mar. 17, 1981

[54] OPTIONALLY FURTHER SUBSTITUTED 5-(2'- OR 4'-PHENOXYPHENYLAZO)-6-HYDROXYPYRIDONE-2 COMPOUNDS CONTAINING A CATIONIC GROUP IN THE 1-POSITION

[75] Inventor: Manfred Greve, Dornach, Switzerland

[73] Assignee: Sandoz Ltd., Basel, Switzerland

[21] Appl. No.: 8,329

[22] Filed: Feb. 1, 1979

Related U.S. Application Data

[63] Continuation of Ser. No. 780,757, Mar. 24, 1977, abandoned.

[30] Foreign Application Priority Data

Mar. 30, 1976 [CH] Switzerland ............... 3957/76

[51] Int. Cl.³ ............... C07C 107/04; C09B 44/08
[52] U.S. Cl. ............... 260/156; 260/146 R; 260/146 D; 260/154; 260/155
[58] Field of Search ........... 260/156, 155, 154, 146 R, 260/146 D

[56] References Cited

U.S. PATENT DOCUMENTS

| | | | |
|---|---|---|---|
| 3,852,261 | 12/1974 | Steinemann | 260/156 |
| 3,998,803 | 12/1976 | Burkhard et al. | 260/156 |
| 4,213,898 | 7/1980 | Entschel et al. | 260/156 |

FOREIGN PATENT DOCUMENTS

| | | | |
|---|---|---|---|
| 1924770 | 11/1970 | Fed. Rep. of Germany | 260/156 |
| 2231245 | 1/1974 | Fed. Rep. of Germany | 260/156 |
| 1296857 | 11/1972 | United Kingdom | 260/156 |
| 1297116 | 11/1972 | United Kingdom | 260/156 |

*Primary Examiner*—Charles F. Warren
*Attorney, Agent, or Firm*—Gerald D. Sharkin; Richard E. Vila; Melvyn M. Kassenoff

[57] ABSTRACT

Compounds of the formula

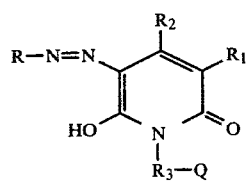

wherein
$R_1$ is hydrogen, cyano, —$COR_4$ or —$CONR_5R_6$, wherein
$R_4$ is $C_{1-4}$ alkyl or phenyl,
$R_5$ is hydrogen, $C_{1-4}$ alkyl or phenyl, and
$R_6$ is hydrogen or primary or secondary $C_{1-4}$ alkyl,
$R_2$ is hydrogen, $C_{1-4}$ alkyl, phenyl, benzyl or phenylethyl,
$R_3$ is a straight or branched $C_{2-8}$ alkylene or alkenylene bridge, optionally interrupted by one oxygen atom,
R is a radical

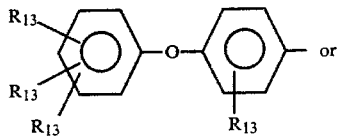

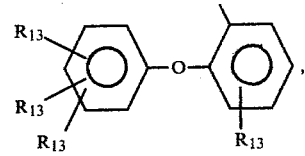

wherein each $R_{13}$, independently, is hydrogen or halogen,
and either Q has a first significance selected from the groups of the formulae

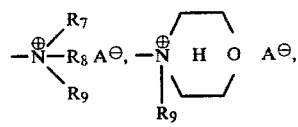

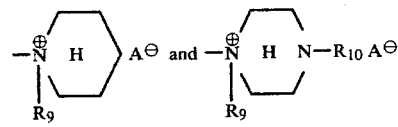

wherein
$R_7$ and $R_8$, independently, are $C_{1-8}$ alkyl,
$R_9$ is $C_{1-4}$ alkyl, unsubstituted or mono-substituted by halogen, $C_{1-4}$ alkoxy, $C_{1-4}$ alkylcarbonyl or benzoyl,
$R_{10}$ is hydrogen or $C_{1-4}$ alkyl, and $A^{\ominus}$ is an anion,
or Q has a second significance selected from the groups of the formulae

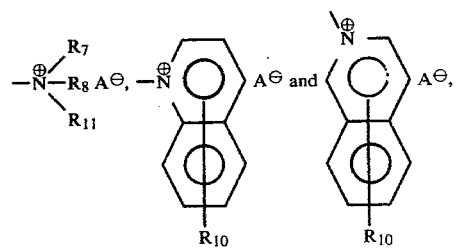

wherein
$R_7$, $R_8$, $R_{10}$ and $A^{\ominus}$ are as defined above, and
$R_{11}$ is benzyl, unsubstituted or substituted in on the phenyl ring by up to three substituents selected from halogen and $C_{1-4}$ alkyl,
with the proviso that when Q has a first significance, given above, bears 3 and only 3 halogen atoms, their production and use in the dyeing of basic dyeable substrates, e.g., substrates comprising or consisting of homopolymers or mixed polymers of acrylonitrile or asymmetric dicyanoethylene or acid-modified synthetic polyamides or polyesters (particularly textile substrates), leather and paper and for the mass dyeing of plastics.

31 Claims, No Drawings

OPTIONALLY FURTHER SUBSTITUTED 5-(2'- OR 4'-PHENOXYPHENYLAZO)-6-HYDROXYPYRIDONE-2 COMPOUNDS CONTAINING A CATIONIC GROUP IN THE 1-POSITION

This application is a continuation of application Ser. No. 780,757, filed Mar. 24, 1977 and now abandoned.

The invention relates to sulpho group free, basic monoazo compounds.

Thus, the invention provides compounds of formula I,

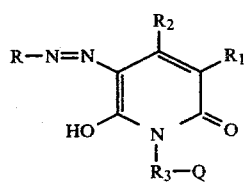

wherein $R_1$ is hydrogen, cyano, $-COR_4$ or $-CONR_5R_6$, wherein $R_4$ is $C_{1-4}$ alkyl or phenyl, $R_5$ is hydrogen, $C_{1-4}$ alkyl or phenyl, preferably hydrogen, and $R_6$ is hydrogen or primary or secondary $C_{1-4}$ alkyl, preferably hydrogen, $R_2$ is hydrogen, $C_{1-4}$ alkyl, phenyl, benzyl or phenylethyl, $R_3$ is a straight or branched $C_{2-8}$ alkylene or alkenylene bridge, optionally interrupted by one oxygen atom, R is a radical (a) or (b)

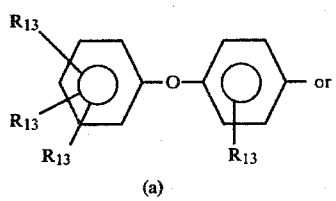

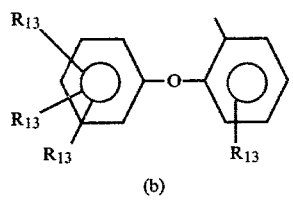

wherein each $R_{13}$, independently, is hydrogen or halogen, (preferably chlorine or bromine), and either Q has a first significance selected from the groups of the formulae

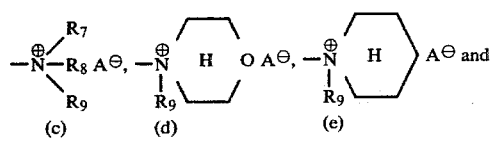

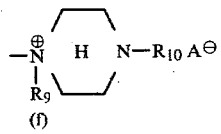

wherein $R_7$ and $R_8$, independently, are $C_{1-8}$ alkyl, $R_9$ is $C_{1-4}$ alkyl, unsubstituted or monosubstituted by halogen (preferably chlorine or bromine), $C_{1-4}$ alkoxy, $C_{1-4}$ alkylcarbonyl or benzoyl, $R_{10}$ is hydrogen or $C_{1-4}$ alkyl, and $A^\ominus$ is an anion, or Q has a second significance selected from the groups of the formulae

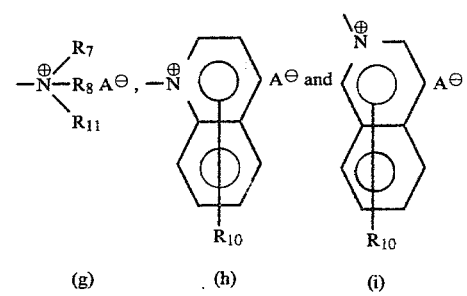

wherein $R_7$, $R_8$, $R_{10}$ and $A^\ominus$ are as defined above, and $R_{11}$ is benzyl, unsubstituted or substituted on the phenyl ring by up to three substitutents selected from halogen (preferably chlorine or bromine) and $C_{1-4}$ alkyl (preferably methyl or ethyl), with the proviso that when Q has a first significance, given above, the radical (a) or (b), as R, bears 3 and only 3 halogen atoms.

The compounds should, of course, be free from

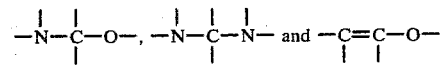

In the compounds of formula I, $R_1$ is preferably cyano or $-CONH_2$, more preferably cyano. $R_2$ is preferably hydrogen, $C_{1-4}$ alkyl (preferably methyl), phenyl or benzyl, more preferably methyl. $R_3$ is preferably $R_{3a}$, more preferably $R_{3b}$, and most preferably 1,2-ethylene or 1,3-propylene. $R_7$ is preferably $C_{1-6}$ alkyl, more preferably $R_{7a}$, still more preferably $R_{7b}$ and most preferably methyl. $R_8$ is preferably $C_{1-6}$ alkyl, more preferably $R_{8a}$, still more preferably $R_{8b}$, and most preferably methyl. $R_9$ is preferably $R_{9a}$, more preferably $R_{9b}$, and most preferably $R_{9c}$. $R_{10}$ is preferably $R_{10a}$, more preferably hydrogen. $R_{11}$ is preferably $R_{11a}$, more preferably $R_{11b}$, and most preferably unsubstituted benzyl. $R_{13}$ is preferably $R_{13a}$, more preferably hydrogen or chlorine. R is preferably $R_a$, more preferably $R_b$, and most preferably $R_c$. Q is preferably $Q_a$, more preferably $Q_b$, and most preferably $Q_c$. The significances of $R_{3a}$, $R_{3b}$, $R_{7a}$, $R_{7b}$, $R_{8a}$, $R_{8b}$, $R_{9a}$, $R_{9b}$, $R_{9c}$, $R_{11a}$, $R_{13a}$, $R_a$, $R_b$, $R_c$, $Q_a$, $Q_b$ and $Q_c$ are hereinafter defined.

The exact nature of the anion $A^\ominus$ in the compounds of the invention is not critical, but preference is given to non-chromophoric anions and to anions conventional in the basic dye art. As examples of anions as $A^\ominus$ may be given the halides, e.g. chloride and bromide anions, the sulphate, bisulphate, methylsulphate, aminosulphate, perchlorate, benzenesulphonate, oxalate, maleinate, acetate, propionate, lactate, succinate, tartrate, malate, methanesulphonate and benzoate anions, as well as complex anions such as those of chlorozinc double salts as well as the anions of the following acids: boric acid, boroglycolic acid, citric acid, glycolic acid, adipic acid, or addition products of ortho-boric acid with polyglycols, particularly cis-polyols.

Preferred compounds of formula I are those of formula Ia,

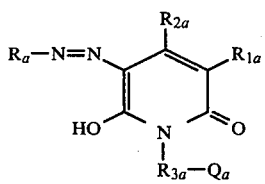

wherein $R_a$ is a radical (aa) or (ba)

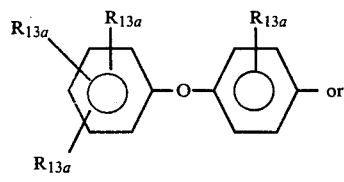

(aa)

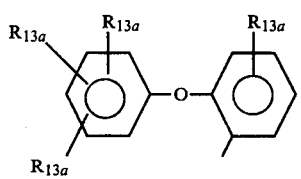

(ba)

wherein the
$R_{13a}$'s, which are the same or different, are hydrogen, chlorine or bromine, a maximum of 3 being chlorine or bromine and where two or three substituents (chlorine or bromine) are borne thereby, such substituents are the same,
$R_{1a}$ is cyano or —CONH$_2$,
$R_{2a}$ is hydrogen, C$_{1-4}$ alkyl, phenyl or benzyl,
$R_{3a}$ is —(CH$_2$)$_n$—,

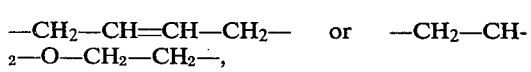

—CH$_2$—CH=CH—CH$_2$—   or   —CH$_2$—CH$_2$—O—CH$_2$—CH$_2$—, wherein
n is 2, 3, 4, 5 or 6,
the $R_{14}$'s, independently, are straight chain C$_{1-4}$ alkyls, provided that where two $R_{14}$'s are present, the total number of carbon atoms is 6 or less, and the asterisked carbon atom is the one bound to the pyridone ring
and either $Q_a$ has a first significance selected from the groups of formulae (c) to (f) above, but wherein
$R_7$ is $R_{7a}$, i.e. C$_{1-6}$ alkyl,
$R_8$ is $R_{8a}$, i.e. C$_{1-6}$ alkyl, $R_9$ is $R_{9a}$, i.e. C$_{1-4}$ alkyl, unsubstituted or monosubstituted by C$_{1-4}$ alkoxy, C$_{1-4}$ alkylcarbonyl or benzoyl, and
$R_{10}$ is $R_{10a}$, i.e. hydrogen, methyl or ethyl,
or $Q_a$ has a second significance selected from the groups of formulae (g) to (i) above, but wherein
$R_7$ is $R_{7a}$, as defined above,
$R_8$ is $R_{8a}$, as defined above,
$R_{10}$ is $R_{10a}$, as defined above, and
$R_{11}$ is $R_{11a}$, i.e. benzyl in which the phenyl nucleus is unsubstituted or substituted by up to 3 substituents selected from chlorine, bromine and C$_{1-4}$ alkyl (preferably methyl or ethyl),
with the proviso that where $Q_a$ has a first significance given above, the radical (aa) or (ba) bears 3 substituents selected from chlorine and bromine.

Particularly preferred compounds are the compounds of formula Ib,

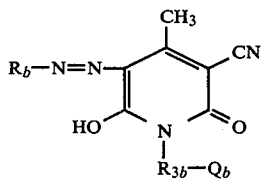

wherein
$R_{3b}$ is —(CH$_2$)$_{n'}$—,

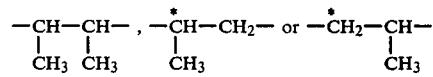

wherein
n' is 2, 3 or 4, and
either $R_b$ is a radical (ab), (bb) or (bc)

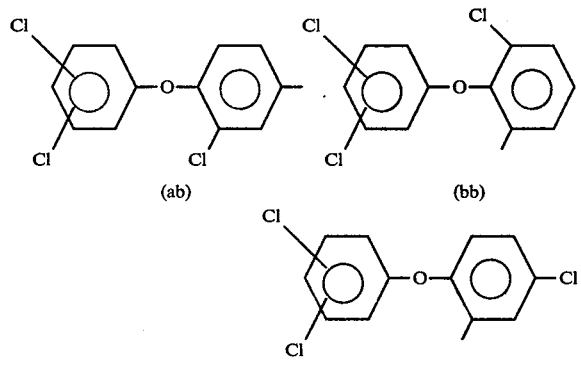

and
$Q_b$ is a group of formula (cb), (db), (eb) or (fb)

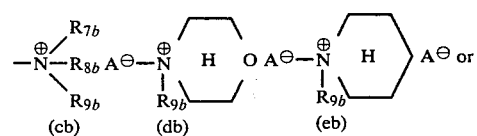

(cb)  (db)  (eb)

-continued

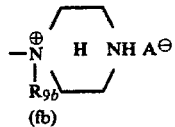

(fb)

wherein
R$_{7b}$ and R$_{8b}$, independently, are C$_{1-4}$ alkyl, preferably methyl or ethyl, and
R$_{9b}$ is a straight chain C$_{1-4}$ alkyl,
or R$_b$ is a radical (aba), (bba) or (bca)

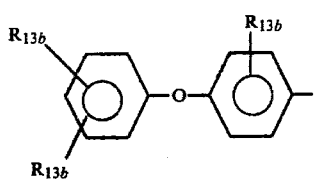

(aba)

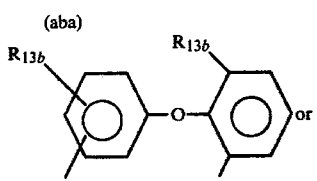

(bba)

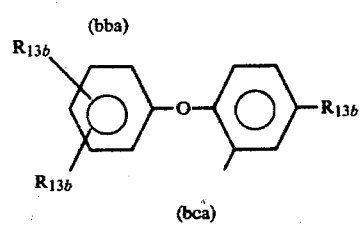

(bca)

wherein
each R$_{13b}$, independently, is hydrogen or chlorine,
and Q$_b$ is a group of formula (gb), (hb) or (ib)

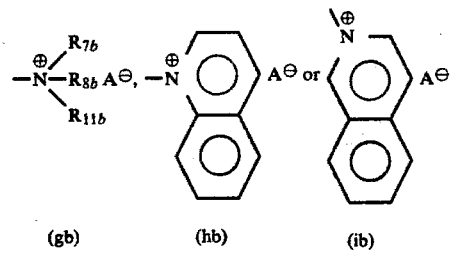

(gb)  (hb)  (ib)

wherein
R$_{7b}$ and R$_{8b}$ are defined above, and
R$_{11b}$ is benzyl, unsubstituted or monosubstituted by methyl, ethyl, chlorine or bromine.
Particularly preferred compounds are of formula Ic,

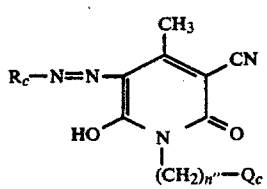

Ic wherein
n" is 2 or 3, and
either R$_c$ is a radical (ab), (bb) or (bc), as defined above, with the proviso that at least one ortho position of the terminal phenoxy group is unsubstituted, and
Q$_c$ is —N$^⊕$R$_{7c}$R$_{8c}$R$_{9c}$ A$^⊖$, wherein R$_{7c}$, R$_{8c}$ and R$_{9c}$ are, independently, methyl or ethyl,
or R$_c$ is a radical (aba), (bba) or (bca) as defined above, with the provisos
 (i) that one to three chlorine substituents are borne thereby and
 (ii) that at least one ortho position of the terminal phenoxy group is unsubstituted,
and Q$_c$ is a radical

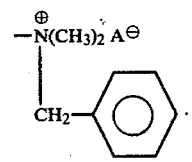

The invention also provides a process for the production of compounds of formula I comprising
(a) coupling the diazo derivative of an amine of formula RNH$_2$ with a compound of the formula II,

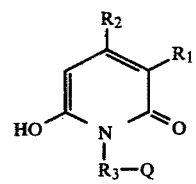

II or
(b) obtaining a compound of formula I in which Q signifies a radical of formula (c), (d), (e), (f) or (g) as defined above, by quaternising a corresponding unquaternised compound employing, as appropriate, a quaternising agent selected from R$_7$A, R$_9$A and R$_{11}$A, wherein A is a radical liberating an anion A$^⊖$ in the quaternisation reaction or a radical liberating an anion replaceable by an anion A$^⊖$.

The above processes may be carried out in conventional manner, the starting materials for which are either known or may also be produced in conventional manner from available corresponding starting materials, e.g. the unquaternised starting materials for process (b) may be obtained in analogous manner to process (a).

As will be appreciated, desired anions A$^⊖$ may be introduced by replacement of other anions employing conventional ion exchange techniques.

The resulting compounds of formula I may be isolated and purified in conventional manner.

The compounds of formula I are useful as basic dyes and may be employed for the dyeing of basic dyeable substrates, e.g. substrates comprising or consisting of homo or mixed polymers of acrylonitrile or of asymmetric dicyanoethylene, or of acid-modified synthetic polyamide or polyester, particularly textile substrates, e.g. in the form of fibres, filaments or fabrics. Such substrates may be dyed in conventional manner, advantageously from neutral or acid bath at a temperature from 60° to boiling temperature, or at temperatures above 100° C. under pressure. They may also be applied from organic liquors, e.g. as described in German Published Specification (D.O.S.) No. 2,437,549.

The compounds possess good dyeing affinity for the above-indicated substrates and are well combinable with other basic dyes having a low combination number (K-value). They exhaust well on to polyacrylonitrile and on to acid-modified polyamides and polyesters and show good pH stability.

Dyeings produced on the above-indicated substrates show notable light, wash, sweat and ironing fastness properties.

In addition to the above substrates, the compounds of formula I may be used in the mass dyeing of plastic materials and in the dyeing of leather and paper.

The compounds of formula I may, if desired, be formulated into dye preparations, for example, stable, concentrated liquid or solid dyeing preparations, e.g. by grinding or granulating or by dissolving in appropriate solvents, optionally with the addition of assistants such as stabilisers or solubility aids such as urea. Such preparations are described in French Patent Nos. 1,572,030 and 1,581,900 and German Published Specification Nos. 2,001,748 and 2,001,816.

The following Examples, in which all parts and percentages are by weight and all temperatures in degrees Centigrade, illustrate the invention.

EXAMPLE 1A: [process (a)]

32.5 Parts 2',4',2-trichloro-4-amino-1,1'-diphenylether hydrochloride were added to 190 parts glacial acetic acid at 90°. At room temperature, 100 parts water and 20 parts concentrated hydrochloric acid were added, followed by cooling to 0° to 5°, addition of 7 parts sodium nitrite dissolved in 20 parts water, filtration and destruction of excess sodium nitrite by addition of aminosulphonic acid. To the resulting solution was added, dropwise, a solution of 37 parts 3-cyano-4-methyl-6-hydroxy-1-(3'-dimethyl-benzylammonium)-propyl-pyridone-(2)chloride in 120 parts water. After coupling, the reaction mixture was diluted with 850 parts water and 20 parts hydrochloric acid, followed by addition of 90 parts sodium chloride and stirring for 3 hours. The precipitated dyestuff of the formula

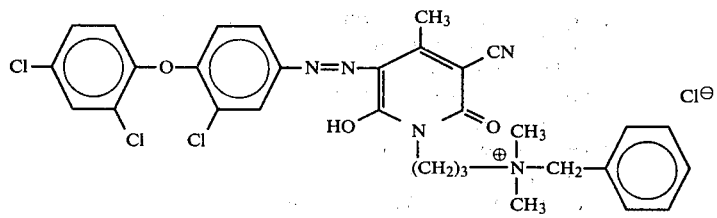

was filtered, washed with water, dried and ground. It dyes polyacrylonitrile fibres yellow, the dyeings having good light and wet fastness properties.

The coupling component employed in the above may be produced by quaternising 3-cyano-4-methyl-6-hydroxy-1-(3'-dimethylaminopropyl pyridone(2) with benzyl chloride in water or in an organic solvent such as acetone, chloroform or dimethylformamide.

EXAMPLE 1B: [process (b)]

The dyestuff produced in Example 1A, above, may alternatively be produced by diazotising 2',4',2-trichloro-4-amino-1,1'-diphenylether hydrochloride in aqueous medium, coupling on to 3-cyano-4-methyl-6-hydroxy-1-(3'-dimethylaminopropyl pyridone(2) and quaternising the resulting compound with benzyl chloride in water or in a suitable organic solvent such as acetone, chloroform or dimethylformamide in the presence of an acid binding agent, such as magnesium oxide or sodium carbonate.

EXAMPLE 2A: [process (a)]

By repeating the procedure described in Example 1A, above, employing 32.5 parts 2',4',4-trichloro-2-amino-1,1'-diphenylether hydrochloride and a solution of 37 parts 3-cyano-4-methyl-6-hydroxy-1-(3'-trimethylammonium)propylpyridone-2 methylsulfate in 350 parts water, the dye of the formula

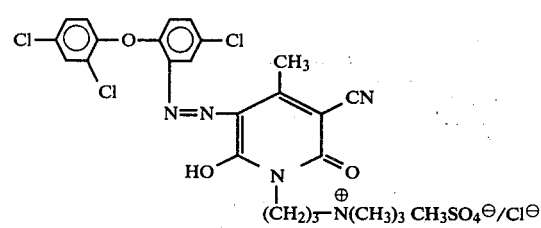

is obtained which dyes polyacrylonitrile fibres yellow with good light and wet fastness properties.

EXAMPLE 2B: [process (b)]

The dyestuff produced in Example 2A, above, may alternatively be produced by diazotising 2',4',4-trichloro-2-amino-1,1'-diphenylether, coupling with 3-cyano-4-methyl-6-hydroxy-1-(3'-dimethylaminopropyl)pyridone(2) followed by quaternisation with dimethylsulphate in water or in an organic solvent such as acetone, chloroform or dimethylformamide in the presence of an acid binding agent, e.g. magnesium oxide or sodium carbonate.

The compounds in the following tables may be produced following, as appropriate, the procedure described in the above Example 1 or 2, the key to the significances of Q in the following tables being as follows:

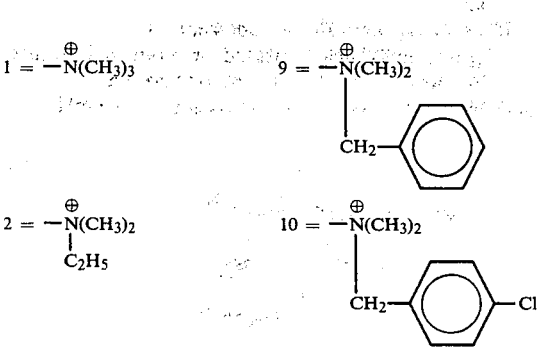

-continued

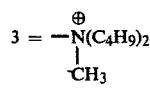

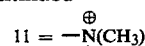
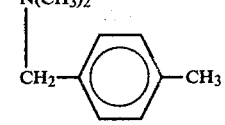

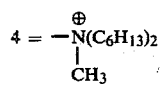

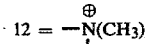
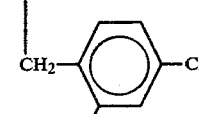

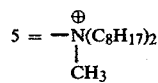

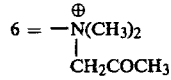

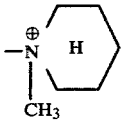

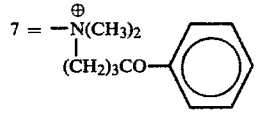

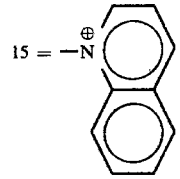

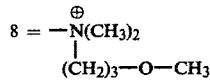

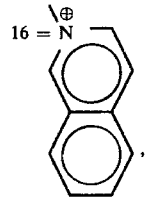

the key to the significances of B being as follows:

1 = —CH$_2$CH$_2$—

2 = —CH$_2$CH$_2$CH$_2$—

3 = —CH$_2$CH=CHCH$_2$—

4 = —$\overset{*}{\text{CH}}$—CH$_2$—
      |
      CH$_3$

5 = —CH$_2$—$\overset{*}{\text{CH}}$—
            |
            CH$_3$

6 = —CH—CH—
     |   |
     CH$_3$ CH$_3$

7 = —CH$_2$CH$_2$OCH$_2$CH$_2$—

8 = —(CH$_2$)$_4$— the asterisked carbon atoms, above ring being bound to the pyridone.

The following Table 1 is of compounds of the formula

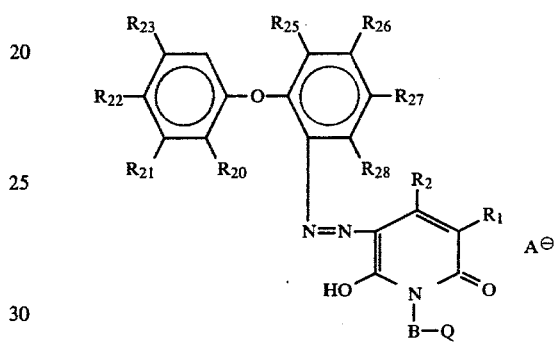

A$^\ominus$ being any of the anions specifically mentioned hereinbefore, the significances of the other symbols being as given in the table.

Yellow dyeings are obtained with all the dyes set out in Tables 1 and 2.

TABLE 1

| Ex. | R$_{20}$ | R$_{21}$ | R$_{22}$ | R$_{23}$ | R$_{25}$ | R$_{26}$ | R$_{27}$ | R$_{28}$ | B | Q | R$_1$ | R$_2$ |
|---|---|---|---|---|---|---|---|---|---|---|---|---|
| 3–12 | Cl | H | Cl | H | H | H | Cl | H | 2 | 1–8,13,14 | CN | CH$_3$ |
| 13–18 | Cl | H | Cl | H | H | H | Cl | H | 1,3–8 | 1 | CN | CH$_3$ |
| 19 | Cl | H | Cl | H | H | H | Cl | H | 2 | 1 | CONH$_2$ | CH$_3$ |
| 20 | Cl | H | Cl | H | H | H | Cl | H | 2 | 1 | CN | C$_2$H$_5$ |
| 21 | Cl | H | Cl | H | H | H | Cl | H | 2 | 1 | CN | —⟨phenyl⟩ |
| 22 | Cl | H | Cl | H | H | H | Cl | H | 2 | 1 | CN | —CH$_2$—⟨phenyl⟩ |
| 23–30 | Cl | H | Cl | H | Cl | H | H | H | 2 | 1–8 | CN | CH$_3$ |
| 31 | Cl | H | Cl | H | H | H | H | Cl | 2 | 1 | CN | CH$_3$ |
| 32 | Cl | H | Cl | H | H | Cl | H | H | 2 | 1 | CN | CH$_3$ |
| 33 | H | Cl | Cl | H | H | H | Cl | H | 2 | 1 | CN | CH$_3$ |
| 34 | H | Cl | H | Cl | Cl | H | H | H | 2 | 1 | CN | CH$_3$ |
| 35–40 | H | H | Cl | H | H | H | Cl | H | 2 | 9–12,15,16 | CN | CH$_3$ |
| 41–44 | H | H | Cl | H | H | H | Cl | H | 1 | 9–12 | CN | CH$_3$ |
| 45–48 | H | H | H | H | H | H | Cl | H | 2 | 9–12 | CN | CH$_3$ |
| 49,50 | H | H | H | H | H | H | H | H | 2 | 9,10 | CN | CH$_3$ |
| 51 | Cl | H | Cl | Cl | H | H | Cl | H | 2 | 9 | CN | CH$_3$ |
| 52 | H | H | Br | H | H | H | Cl | H | 2 | 9 | CN | CH$_3$ |
| 53 | H | H | H | H | H | H | H | Cl | 4 | 9 | CN | CH$_3$ |
| 54 | H | H | H | H | Cl | H | H | H | 2 | 9 | CN | CH$_3$ |
| 55 | H | H | Cl | H | H | H | Cl | H | 3 | 9 | CN | CH$_3$ |
| 56 | H | Cl | H | H | H | H | Cl | H | 1 | 11 | CN | CH$_3$ |
| 57 | Cl | H | Cl | H | H | H | Cl | H | 5 | 2 | CN | CH$_3$ |
| 58,59 | Cl | H | Cl | H | H | H | Cl | H | 1,2 | 9 | CN | CH$_3$ |
| 60 | Cl | H | Cl | H | H | H | Cl | H | 7 | 6 | CN | CH$_3$ |
| 61 | H | H | H | H | Cl | H | H | H | 2 | 9 | CN | CH$_3$ |

TABLE 1-continued

| Ex. | $R_{20}$ | $R_{21}$ | $R_{22}$ | $R_{23}$ | $R_{25}$ | $R_{26}$ | $R_{27}$ | $R_{28}$ | B | Q | $R_1$ | $R_2$ |
|---|---|---|---|---|---|---|---|---|---|---|---|---|
| 62 | H | H | H | H | Cl | H | H | H | 2 | 10 | CN | $CH_3$ |
| 63 | H | Cl | H | H | H | Cl | H | H | 1 | 11 | CN | $C_2H_5$ |

The following Table 2 is of compounds of the formula

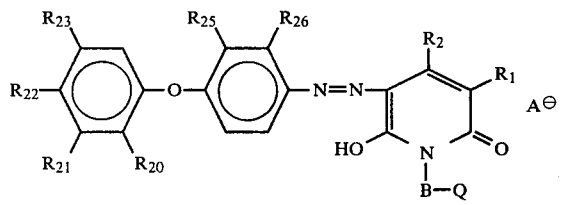

$A^\ominus$ being any of the anions specifically mentioned hereinbefore, preferably chloride or methylsulphate.

TABLE 2

| Ex. | $R_{20}$ | $R_{21}$ | $R_{22}$ | $R_{23}$ | $R_{25}$ | $R_{26}$ | B | Q | $R_1$ | $R_2$ |
|---|---|---|---|---|---|---|---|---|---|---|
| 64–73 | Cl | H | Cl | H | Cl | H | 2 | 1–8,13,14 | CN | $CH_3$ |
| 74–83 | Cl | H | Cl | H | Cl | H | 1 | 1–8,13,14 | CN | $CH_3$ |
| 84 | Cl | H | Cl | H | Cl | H | 2 | 2 | $CONH_2$ | $CH_3$ |
| 85 | Cl | H | Cl | H | Cl | H | 2 | 1 | CN | $C_2H_5$ |
| 86 | Cl | H | Cl | H | H | Cl | 2 | 1 | CN | $CH_3$ |
| 87–92 | Cl | H | Cl | H | Cl | H | 3–8 | 1 | CN | $CH_3$ |
| 93 | H | Cl | Cl | H | Cl | H | 2 | 1 | CN | $CH_3$ |
| 94 | H | Cl | H | Cl | Cl | H | 2 | 1 | CN | $CH_3$ |
| 95–97 | Cl | H | Cl | H | Cl | H | 2 | 10–12 | CN | $CH_3$ |
| 98 | Cl | H | Cl | H | Cl | H | 1 | 9 | CN | $CH_3$ |
| 99–104 | Cl | H | H | H | Cl | H | 2 | 9–12,15,16 | CN | $CH_3$ |
| 105–107 | H | H | Cl | H | Cl | H | 1 | 9,15,16 | CN | $CH_3$ |
| 108 | H | H | Cl | H | Cl | H | 2 | 9 | CN | $CH_3$ |
| 109 | H | Cl | H | H | Cl | H | 2 | 9 | CN | $CH_3$ |
| 110 | Cl | H | H | H | Cl | H | 2 | 12 | CN | $CH_3$ |
| 111 | H | H | Cl | H | H | H | 2 | 9 | CN | $CH_3$ |
| 112 | H | H | Br | H | H | H | 2 | 9 | CN | $CH_3$ |
| 113 | H | H | H | H | Cl | H | 2 | 9 | CN | $CH_3$ |
| 114 | H | H | H | H | Cl | H | 6 | 10 | CN | $CH_3$ |
| 115 | Cl | H | Cl | H | Cl | H | 3 | 2 | CN | $CH_3$ |
| 116 | Cl | H | Cl | H | Cl | H | 6 | 6 | CN | $CH_3$ |
| 117 | Cl | H | H | Cl | Cl | H | 2 | 11 | CN | $CH_3$ |

DYEING EXAMPLE A 20 parts of the dyestuff described in Example 1A and 80 parts of dextrin are ground for 4 hours in a powder mill. The same dyestuff mixture may also be obtained by making a paste with 100 parts of water and subsequently spray-drying it. 1 part of the preparation thus obtained is made into a paste with 1 part of 40% acetic acid, the paste is covered with 200 parts of demineralised water and boiled for a short time. This is then diluted with 7000 parts of demineralised water, then 2 parts of glacial acetic acid are added, and it is entered into a dyebath at 60° together with 100 parts of polyacrylonitrile fabric. The material may already be pretreated for 10–15 minutes at 60° in a bath consisting of 8000 parts of water and 2 parts of glacial acetic acid.

The bath is heated over the course of 30 minutes to 98°–100°, boiled for 1½ hours and the fabric then removed and rinsed. A yellow dyeing is obtained, with good light and wet fastness properties.

10 parts of the dyestuff given in Example 1 may also be dissolved in 60 parts of glacial acetic acid and 30 parts of water. A stable, concentrated solution of the dyestuff is obtained, with a dyestuff content of about 10%, which may be used as in the above dyeing formula for dyeing polyacrylonitrile.

DYEING EXAMPLE B 20 parts of the dyestuff of Example 1A are mixed for 48 hours in a ball mill with 80 parts of dextrin; 1 part of the preparation thus obtained is made into a paste with 1 part of 40% acetic acid, the paste is covered with 200 parts of demineralised water and boiled for a short time. Dyeing takes place as follows using this stock solution:

(a) The stock solution is diluted with 7000 parts of demineralised water, then 21 parts of calcined sodium sulphate, 14 parts of ammonium sulphate, 14 parts of formic acid and 15 parts of a carrier based on reaction products of ethylene oxide with dichlorophenols are added, and it is entered with a dyebath at 60°, together with 100 parts of acid modified polyester fabric. The material may already be pretreated for 10–15 minutes at 60° in a bath consisting of 8000 parts of water and 2 parts of glacial acetic acid.

The bath is heated over the course of 30 minutes to 98°–100°, boiled for one hour and the substrate then removed and rinsed. An even yellow dyeing with good wet fastness is obtained.

(b) The stock is diluted with 3000 parts of demineralised water, then 18 parts of calcined sodium sulphate and 6 parts each of ammonium sulphate and formic acid are added, and it is entered into a dyebath at 60°, together with 100 parts of acid modified polyester fabric. The bath is a closed system and is heated over the course of 45 minutes to 110°, this temperature is maintained for 1 hour with shaking, then it is cooled over the course of 25 minutes to 60°, and the fabric removed and rinsed. An even yellow dyeing with good wet fastness is obtained.

(c) The process is as in (b), but the closed vessel is heated for 1 hour at 120°.

DYEING EXAMPLE C 20 parts of the dyestuff of Example 1A are mixed for 48 hours in a ball mill with 80 parts of dextrin.

1 part of the preparation thus obtained is made into a paste with 1 part of 40% acetic acid, the paste is covered with 200 parts of demineralised water and boiled for a short time. This solution is added to the dye bath which is prepared as follows:

The solution is diluted with 700 parts of demineralised water, then 21 parts of calcined sodium sulphate, 14 parts of ammonium sulphate, 14 parts of formic acid and 15 parts of a carrier based on reaction products of ethylene oxide with dichlorophenols are added, and the liquor is buffered with an acid buffering solution to give a pH of 6, and this is then entered at 25° with 100 parts of acid modified polyamide fabric which is modified by acid groups into the dyeing vessel, at a liquor ratio of 1:80. The bath is heated over the course of 45 minutes to 98°, boiled for one hour and the fabric then rinsed under running water at 70°–80°, and subsequently under cold water. The fabric may be centrifuged so as to dry it, and then ironed.

A yellow dyeing with good fastness properties is obtained.

What is claimed is:

1. A compound of the formula $$R-N=N-\text{[pyridone ring with } R_2, R_1, HO, N-R_3-Q, O\text{]}$$

wherein R is

[two biphenyl ether structures with $R_{13}$ substituents]

wherein
each $R_{13}$ is independently hydrogen or halo, with the proviso that at least one $R_{13}$ is halo,
$R_1$ is hydrogen, cyano, —$COR_4$ or —$CONR_5R_6$, wherein
$R_4$ is $C_{1-4}$alkyl or phenyl,
$R_5$ is hydrogen, $C_{1-4}$alkyl or phenyl, and
$R_6$ is hydrogen or primary or secondary $C_{1-4}$alkyl,
$R_2$ is hydrogen, $C_{1-4}$alkyl, phenyl, benzyl or phenylethyl,
$R_3$ is straight or branched $C_{2-8}$alkylene, straight or branched $C_{2-8}$alkenylene or -Alk-O-Alk-, wherein
each Alk is straight or branched alkylene or alkenylene, with the provisos that the two Alk radicals together contain no more than 8 carbon atoms and not more than one Alk radical is straight or branched alkenylene, and
Q is

[ammonium/morpholinium structures with $R_7, R_8, R_9$ and $A^\ominus$]

[piperidinium, piperazinium structures with $R_9, R_{10}$ and $A^\ominus$; another ammonium with $R_7, R_8, R_{11}$]

[pyridinium and isoquinolinium structures with $R_{10}$ and $A^\ominus$]

wherein
each of $R_7$ and $R_8$ is independently $C_{1-8}$alkyl,
$R_9$ is $C_{1-4}$alkyl or $C_{1-4}$alkyl monosubstituted by halo, $C_{1-4}$alkoxy, ($C_{1-4}$alkyl)carbonyl or benzoyl,
$R_{10}$ is hydrogen or $C_{1-4}$alkyl,
$R_{11}$ is benzyl or benzyl having 1 to 3 substituents selected from halo and $C_{1-4}$alkyl on its phenyl ring, and
$A^\ominus$ is an anion,
with the provisos that three of the $R_{13}$'s are halo and one $R_{13}$ is hydrogen when Q is

[ammonium/morpholinium structures with $R_7, R_8, R_9$ and $A^\ominus$]

[piperidinium and piperazinium structures with $R_9, R_{10}$ and $A^\ominus$]

and that the molecule is free of $$-N-\overset{|}{\underset{|}{C}}-O-,\ -N-\overset{|}{\underset{|}{C}}-N-\ \text{and}\ \overset{\diagdown}{\diagup}C=C\overset{\diagup}{\underset{O-}{\diagdown}}$$

radicals.

2. A compound according to claim 1 wherein Q is

[ammonium, morpholinium, piperidinium structures with $R_7, R_8, R_9$ and $A^\ominus$]

[piperazinium structure with $R_9, R_{10}$ and $A^\ominus$]

3. A compound according to claim 3 wherein Q is

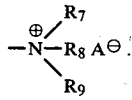

4. A compound according to claim 2 wherein Q is

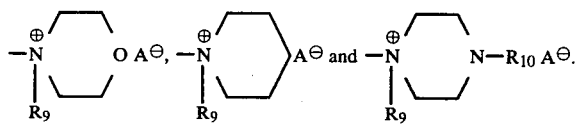

5. A compound according to claim 1 wherein Q is

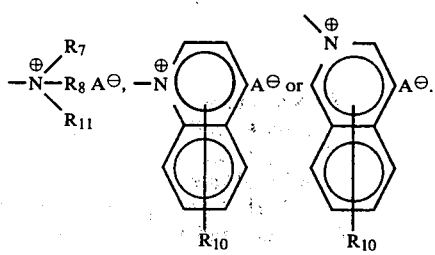

6. A compound according to claim 5 wherein Q is

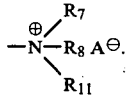

7. A compound according to claim 5 wherein Q is

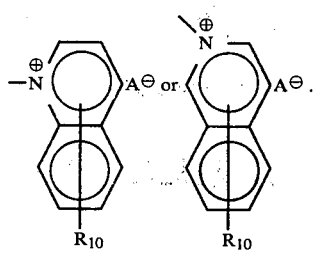

8. A compound according to claim 1 having the formula

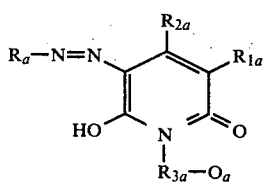

wherein $R_a$ is

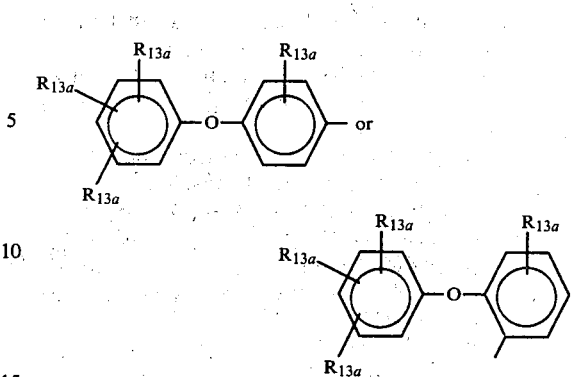

wherein
each $R_{13a}$ is independently hydrogen, chloro or bromo, with the provisos that (i) at least one $R_{13a}$ is hydrogen, (ii) at least one $R_{13a}$ is chloro or bromo, (iii) when an $R_{13a}$ is chloro, each of the others is hydrogen or chloro and (iv) when an $R_{13a}$ is bromo, each of the others is hydrogen or bromo,
$R_{1a}$ is cyano or $-CONH_2$,
$R_{2a}$ is hydrogen, $C_{1-4}$ alkyl, phenyl or benzyl,
$R_{3a}$ is $-(CH_2)_n-$,

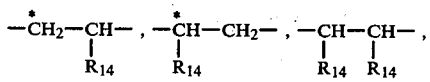

$-CH_2-CH=CH-CH_2-$ or $-CH_2-CH_2-O-CH_2-CH_2-$,
wherein
each $R_{14}$ is independently n-$C_{1-4}$alkyl, with the proviso that when two $R_{14}$'s are present the total number of carbon atoms is not greater than 6,
n is 2, 3, 4, 5 or 6, and
the * indicates the carbon atom attached to the pyridone ring, and
$Q_a$ is

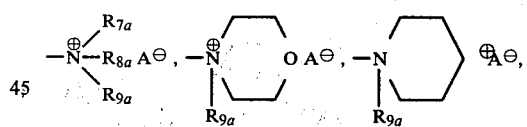

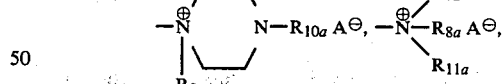

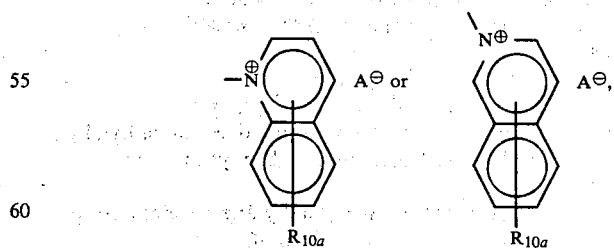

wherein
$R_{7a}$ is $C_{1-6}$alkyl,
$R_{8a}$ is $C_{1-6}$alkyl,
$R_{9a}$ is $C_{1-4}$alkyl or $C_{1-4}$alkyl monosubstituted by $C_{1-4}$alkoxy, ($C_{1-4}$alkyl)carbonyl or benzoyl,
$R_{10a}$ is hydrogen, methyl or ethyl, $R_{11a}$ is benzyl or benzyl having 1 to 3 substituents selected from chloro, bromo and $C_{1-4}$alkyl on its phenyl ring, and $A^{\ominus}$ is an anion, with the provisos that three of the $R_{13a}$'s are chloro or bromo and one $R_{13a}$ is hydrogen when $Q_a$ is

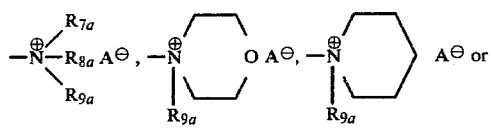

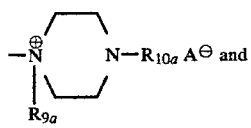

that the molecule is free of

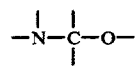

radicals.

9. A compound according to claim 8 wherein $Q_a$ is

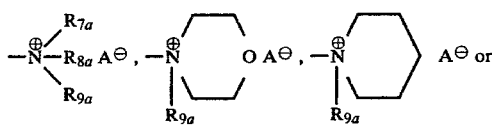

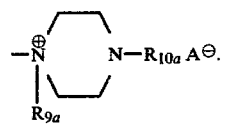

10. A compound according to claim 9 wherein $Q_a$ is

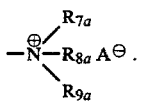

11. A compound according to claim 9 wherein $Q_a$ is

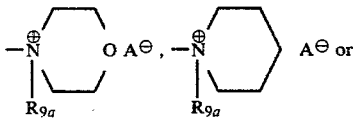

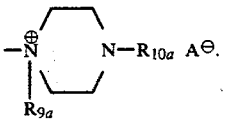

12. A compound according to claim 8 wherein $Q_a$ is

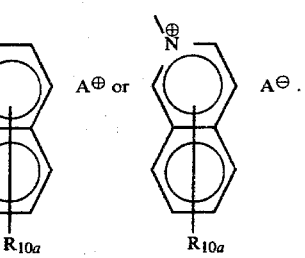

13. A compound according to claim 12 wherein $Q_a$ is

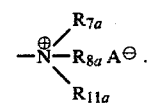

14. A compound according to claim 12 wherein $Q_a$ is

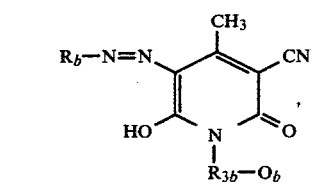

15. A compound according to claim 8 having the formula

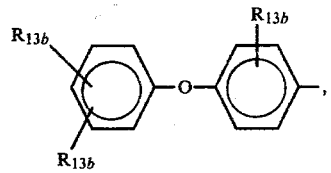

wherein $R_b$ is

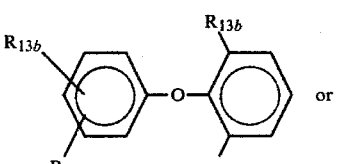

-continued

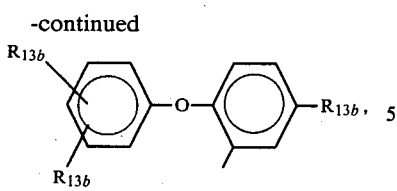

wherein
each $R_{13b}$ is independently hydrogen or chloro, with the proviso that at least one $R_{13b}$ is chloro,
$R_{3b}$ is —$(CH_2)_{n'}$—,

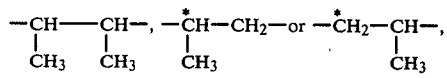

wherein
n' is 2, 3 or 4, and
the * indicates the carbon atom attached to the pyridone ring, and
$Q_b$ is

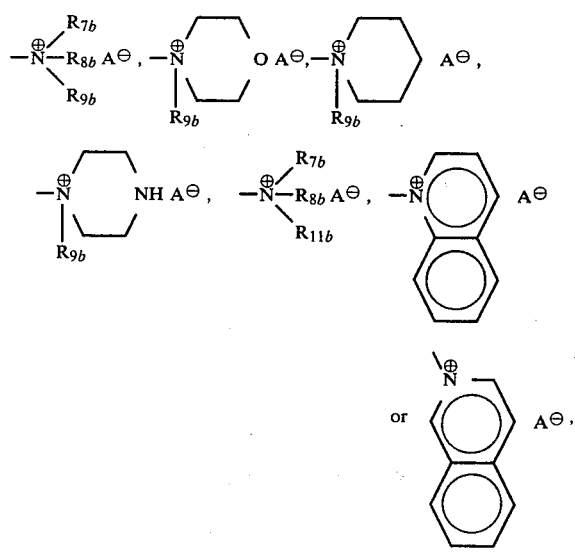

wherein
$R_{7b}$ is $C_{1-4}$alkyl,
$R_{8b}$ is $C_{1-4}$alkyl,
$R_{9b}$ is n-$C_{1-4}$alkyl,
$R_{11b}$ is benzyl or benzyl the phenyl ring of which is monosubstituted by methyl, ethyl, chloro or bromo, and
$A^\ominus$ is an anion,
with the proviso that $R_b$ is

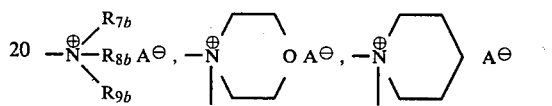

when $Q_b$ is

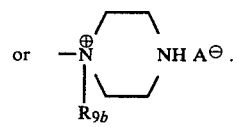

16. A compound according to claim 15 wherein
$R_b$ is

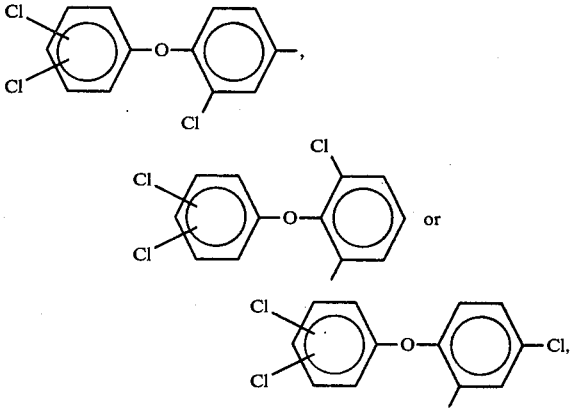

and
$Q_b$ is

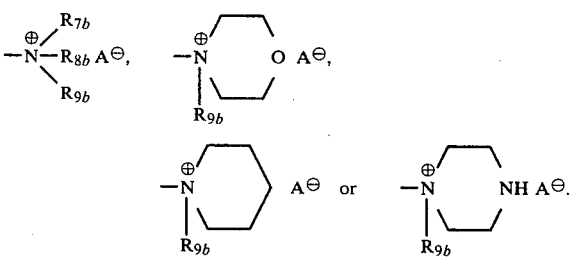

17. A compound according to claim 16 wherein
$Q_b$ is

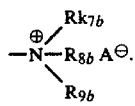

18. A compound according to claim 16 wherein
$Q_b$ is

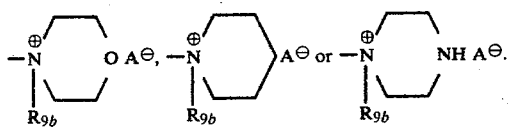

19. A compound according to claim 15 wherein
$R_b$ is

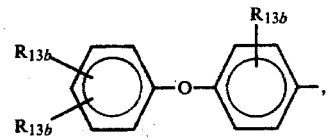

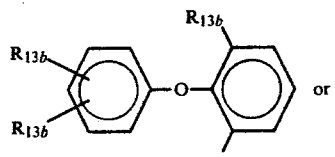

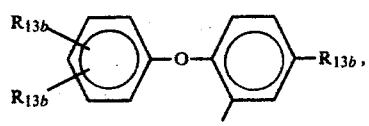

and
$Q_b$ is

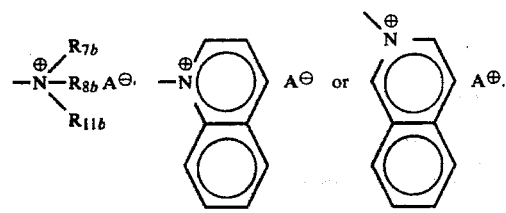

20. A compound according to claim 19 wherein
$Q_b$ is

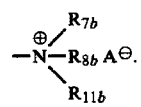

21. A compound according to claim 20 wherein
$R_{11b}$ is benzyl.

22. A compound according to claim 19 wherein
$Q_b$ is

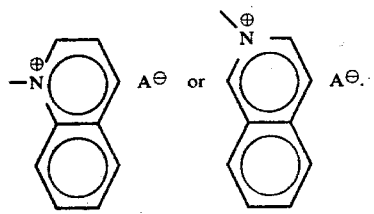

23. A compound according to claim 15 wherein n' is 2 or 3.

24. A compound according to claim 23 having the formula

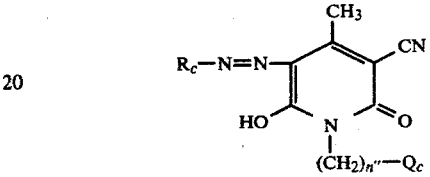

wherein
$R_c$ is

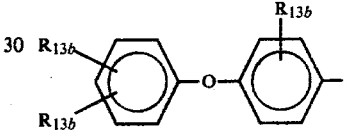

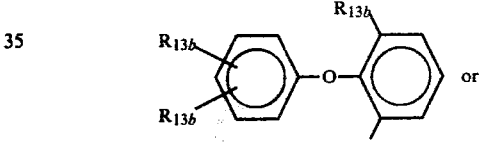

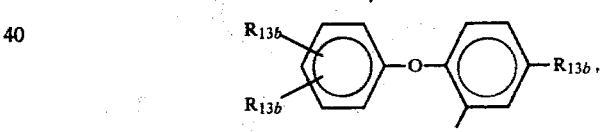

wherein each
$R_{13b}$ is hydrogen or chloro, with the proviso that at least one $R_{13b}$ is chloro,
with the proviso that at least one of the ortho positions of the terminal phenoxy, chlorophenoxy or dichlorophenoxy group does not bear a chloro substituent,
$Q_c$ is

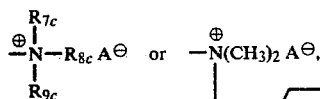

wherein
each of $R_{7c}$, $R_{8c}$ and $R_{9c}$ is independently methyl or ethyl, and
$A^{\ominus}$ is an anion, and
n" is 2 or 3,
with the proviso that $R_c$ is

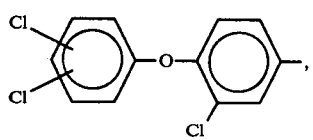
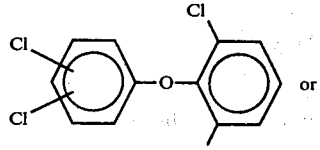 or
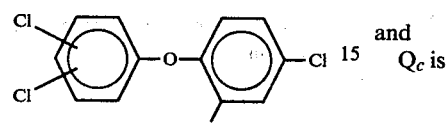
when $Q_c$ is
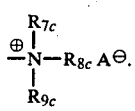
25. A compound according to claim 24 wherein
$R_c$ is
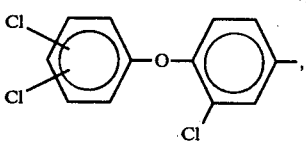,
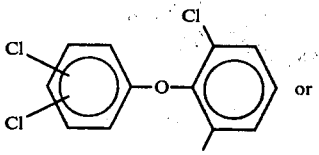 or
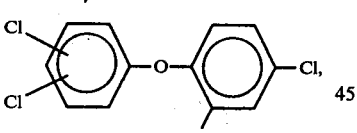,
and
$Q_c$ is
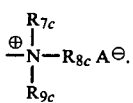
26. A compound according to claim 25 wherein
each of $R_{7c}$, $R_{8c}$ and $R_{9c}$ is methyl.
27. A compound according to claim 24 wherein
$R_c$ is
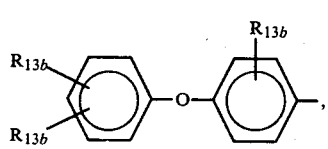,
-continued
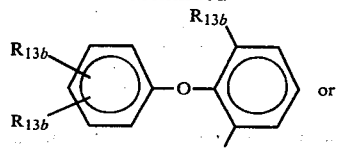 or
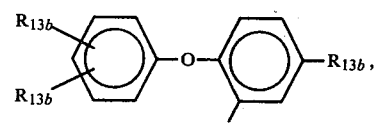,
and
$Q_c$ is
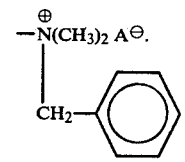
28. A compound according to claim 24 wherein n'' is 3.
29. A compound according to claim 28 having the formula
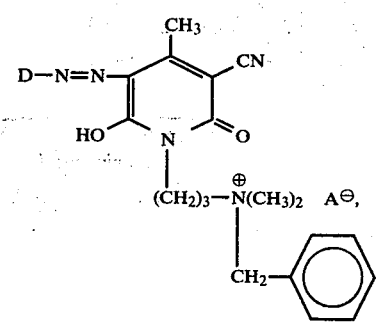
wherein
D is
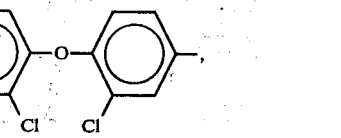,
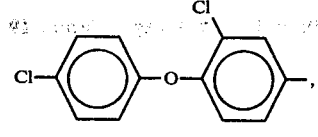,
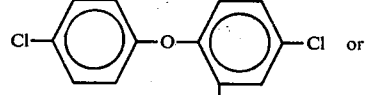 or
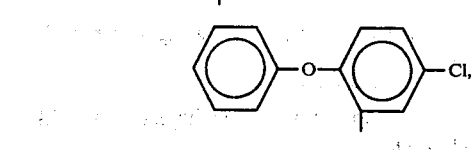,
and $A^{\ominus}$ is an anion.
30. A compound according to claim 28 having the formula
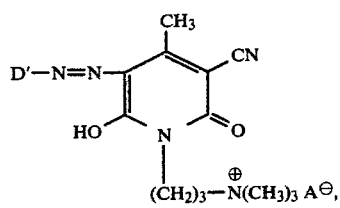
wherein
D' is
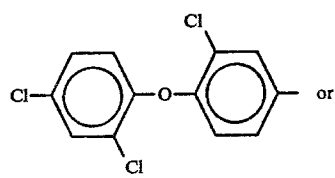 or
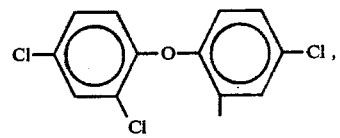
and
$A^{\ominus}$ is an anion.
31. The compound according to claim 29 having the formula
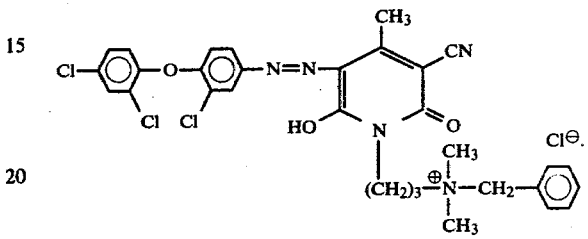
* * * * *